United States Patent
Nishio et al.

(10) Patent No.: US 9,590,234 B2
(45) Date of Patent: Mar. 7, 2017

(54) NONAQUEOUS ELECTROLYTE SECONDARY BATTERY

(71) Applicant: SANYO Electric Co., Ltd., Daito-shi, Osaka (JP)

(72) Inventors: Yusuke Nishio, Tokushima (JP); Masanori Maekawa, Tokushima (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 14/439,106

(22) PCT Filed: Oct. 25, 2013

(86) PCT No.: PCT/JP2013/006327
§ 371 (c)(1),
(2) Date: Apr. 28, 2015

(87) PCT Pub. No.: WO2014/068931
PCT Pub. Date: May 8, 2014

(65) Prior Publication Data
US 2015/0318537 A1 Nov. 5, 2015

(30) Foreign Application Priority Data
Oct. 30, 2012 (JP) .................................. 2012-239627

(51) Int. Cl.
| | | |
|---|---|---|
| *H01M 4/36* | (2006.01) | |
| *H01M 4/131* | (2010.01) | |
| *H01M 4/134* | (2010.01) | |
| *H01M 4/133* | (2010.01) | |
| *H01M 4/583* | (2010.01) | |
| *H01M 4/48* | (2010.01) | |
| *H01M 4/505* | (2010.01) | |
| *H01M 4/525* | (2010.01) | |
| *H01M 4/38* | (2006.01) | |
| *H01M 10/0525* | (2010.01) | |
| *H01M 4/02* | (2006.01) | |
| *H01M 10/052* | (2010.01) | |

(52) U.S. Cl.
CPC .......... *H01M 4/131* (2013.01); *H01M 4/133* (2013.01); *H01M 4/134* (2013.01); *H01M 4/364* (2013.01); *H01M 4/386* (2013.01); *H01M 4/48* (2013.01); *H01M 4/505* (2013.01); *H01M 4/525* (2013.01); *H01M 4/583* (2013.01); *H01M 10/0525* (2013.01); *H01M 10/052* (2013.01); *H01M 2004/027* (2013.01); *H01M 2004/028* (2013.01); *Y02E 60/122* (2013.01); *Y02T 10/7011* (2013.01)

(58) Field of Classification Search
CPC ...... H01M 4/364; H01M 4/131; H01M 4/134; H01M 4/48; H01M 4/505; H01M 4/525; H01M 4/386; H01M 4/133; H01M 4/583; H01M 10/052; H01M 2004/028; H01M 2004/027; Y02E 60/122
See application file for complete search history.

(56) References Cited

U.S. PATENT DOCUMENTS

| | | |
|---|---|---|
| 2006/0204845 A1 | 9/2006 | Chang et al. |
| 2007/0218363 A1 | 9/2007 | Paulsen et al. |
| 2008/0026292 A1 | 1/2008 | Paulsen et al. |
| 2008/0193846 A1 | 8/2008 | Morishima |
| 2009/0142663 A1 | 6/2009 | Takeuchi et al. |
| 2009/0325061 A1 | 12/2009 | Lim |
| 2011/0216360 A1 | 9/2011 | Cho et al. |
| 2011/0309290 A1 | 12/2011 | Paulsen et al. |
| 2012/0217435 A1 | 8/2012 | Yamamoto et al. |
| 2014/0050985 A1* | 2/2014 | Lee .................. H01M 4/36 429/220 |

FOREIGN PATENT DOCUMENTS

| | | |
|---|---|---|
| JP | 2005-11588 A | 1/2005 |
| JP | 2007-53083 A | 3/2007 |
| JP | 2007-207490 A | 8/2007 |
| JP | 2008-198465 A | 8/2008 |
| JP | 2009-530224 A | 8/2009 |
| JP | 2009-266712 A | 11/2009 |
| JP | 2010-15986 A | 1/2010 |
| JP | 2010-199077 A | 9/2010 |
| JP | 2011-96650 A | 5/2011 |
| JP | 2011-181528 A | 9/2011 |
| JP | 2011-182402 A | 9/2011 |

OTHER PUBLICATIONS

International Search Report dated Dec. 10, 2013 issued in corresponding application No. PCT/JP2013/006327.

* cited by examiner

*Primary Examiner* — Laura Weiner
(74) *Attorney, Agent, or Firm* — Westerman, Hattori, Daniels & Adrian, LLP

(57) ABSTRACT

The present invention has an object to provide a nonaqueous electrolyte secondary battery having high capacity and excellent cycle characteristics. A nonaqueous electrolyte secondary battery according to an embodiment of the present invention includes a positive electrode plate containing a lithium-cobalt composite oxide and a lithium-nickel-cobalt-manganese composite oxide ($Li_aNi_bCo_cMn_{1-b-c}O$, $0.9 < a \leq 1.2$, $0 < b \leq 0.8$, $0 < c \leq 0.9$) having an average primary particle size of 1.2 μm to 5.0 μm and a negative electrode which contains one of silicon (Si) and silicon oxide ($SiO_x$, $0.5 \leq x < 1.6$) and which includes a negative electrode active material that stores and releases lithium ions.

3 Claims, 1 Drawing Sheet

NONAQUEOUS ELECTROLYTE SECONDARY BATTERY

TECHNICAL FIELD

The present invention relates to a nonaqueous electrolyte secondary battery having high capacity and excellent cycle characteristics.

BACKGROUND ART

Nonaqueous electrolyte secondary batteries represented by lithium ion batteries are widely used as driving power supplies for portable electronic devices such as mobile phones including smartphones, portable computers, PDAs, and portable music players. Furthermore, the nonaqueous electrolyte secondary batteries are widely used in driving power supplies for electric vehicles (EVs) and hybrid electric vehicles (HEVs and PHEVs) and stationary storage battery systems for applications for suppressing power fluctuations in solar power generation, wind power generation, and the like and peak shift applications for grid power for the purpose of storing power during nighttime and using power during daytime.

In particular, a lithium-cobalt composite oxide ($LiCoO_2$) and different element-doped lithium-cobalt composite oxides doped with Al, Mg, Ti, Zr, or the like have more excellent battery characteristics as compared to others and therefore are widely used. However, cobalt is expensive and the abundance thereof is small as a resource. Therefore, in order to continue to use the lithium-cobalt composite oxide ($LiCoO_2$) and the different element-doped lithium-cobalt composite oxides as positive electrode active materials for nonaqueous electrolyte secondary batteries, the nonaqueous electrolyte secondary batteries are required to have higher performance.

For example, Patent Literature 1 below discloses the invention of a nonaqueous electrolyte secondary battery having high capacity, excellent cycle characteristics, and excellent safety at high temperature. For the purpose of obtaining the nonaqueous electrolyte secondary battery, a mixture of a lithium-cobalt composite oxide and a lithium-nickel-cobalt-manganese composite oxide with a layered structure is used as a positive electrode active material, graphite is used as a negative electrode active material, and a separator with specific physical properties is used in combination therewith. The potential of the positive electrode active material is 4.4 V to 4.6 V on a lithium basis.

On the other hand, in the case of using a negative electrode active material made of a carbon material, lithium can be intercalated only up to the composition of $LiC_6$ and a theoretical capacity of 372 mAh/g is a limit, which is an obstacle to increasing the capacity of batteries. Therefore, the following batteries are under development: nonaqueous electrolyte secondary batteries in which silicon, which is alloyed with lithium, a silicon alloy, or silicon oxide is used as a negative electrode active material with high energy density per mass and volume. For example, silicon allows lithium to be intercalated up to the composition of $Li_{4.4}Si$, resulting in a theoretical capacity of 4,200 mAh/g, and therefore it can be expected to exhibit much higher capacity than the case of using a carbon material as a negative electrode active material.

For example, Patent Literature 2 below discloses the invention of a nonaqueous electrolyte secondary battery in which one containing graphite and a material containing silicon and oxygen as constituent elements (where the element ratio x of oxygen to silicon satisfies $0.5 \leq x \leq 1.5$) is used as a negative electrode active material, the proportion of the material containing silicon and oxygen as a constituent element being 3% to 20% by mass on the basis that the sum of graphite and the material containing silicon and oxygen as a constituent element is 100% by mass.

Furthermore, Patent Literature 3 below discloses the invention of a nonaqueous electrolyte secondary battery in which for the purpose of increasing the capacity of the battery by reducing the amount of a negative electrode active material in the case of using lithium nickel oxide, which has high irreversible capacity, as a positive electrode active material, a lithium-nickel composite oxide is used as a positive electrode active material and at least one selected from metallic silicon, a silicon oxide, and a silicon alloy is used as a negative electrode active material.

CITATION LIST

Patent Literature

PTL 1: Japanese Published Unexamined Patent Application No. 2010-199077
PTL 2: Japanese Published Unexamined Patent Application No. 2011-182402
PTL 3: Japanese Published Unexamined Patent Application No. 2010-015986

SUMMARY OF INVENTION

Technical Problem

According to the invention disclosed in Patent Literature 1, a nonaqueous electrolyte secondary battery having high capacity, excellent cycle characteristics, and excellent safety at high temperature is obtained. According to the invention disclosed in Patent Literatures 2 and 3, a nonaqueous electrolyte secondary battery with higher capacity than the case of using graphite as a negative electrode active material can be obtained.

However, in the case of using metallic silicon or silicon oxide represented by $SiO_x$ ($0.5 \leq x \leq 1.6$) as a negative electrode active material instead of graphite in the nonaqueous electrolyte secondary battery disclosed in Patent Literature 1, there is a problem that the capacity retention is rapidly deteriorated when a charge/discharge cycle is repeated.

According to an embodiment of the present invention, since the relationship between the average primary particle size of a lithium-cobalt composite oxide and the average primary particle size of a lithium-nickel-cobalt-manganese composite oxide has been reviewed, a nonaqueous electrolyte secondary battery capable of achieving good capacity retention even in the case of repeating a charge/discharge cycle can be provided.

Solution to Problem

According to an embodiment of the present invention, the following battery is provided: a nonaqueous electrolyte secondary battery including a positive electrode plate containing a lithium-cobalt composite oxide ($LiCoO_2$) and a lithium-nickel-cobalt-manganese composite oxide ($Li_aNi_bCo_cMn_{1-b-c}O_2$, $0.9<a\leq1.2$, $0<b\leq0.8$, $0<c\leq0.9$) having an average primary particle size of 1.2 μm to 5.0 μm as a positive electrode active material, a negative electrode plate containing at least one of silicon (Si) and silicon oxide ($SiO_x$, $0.5 \leq x < 1.6$) as a negative electrode active material, a separator, and a nonaqueous electrolyte.

Advantageous Effects of Invention

In accordance with a nonaqueous electrolyte secondary battery according to an embodiment of the present invention, a nonaqueous electrolyte secondary battery having high capacity and excellent cycle characteristics is obtained.

DESCRIPTION OF EMBODIMENTS

Figure 1:
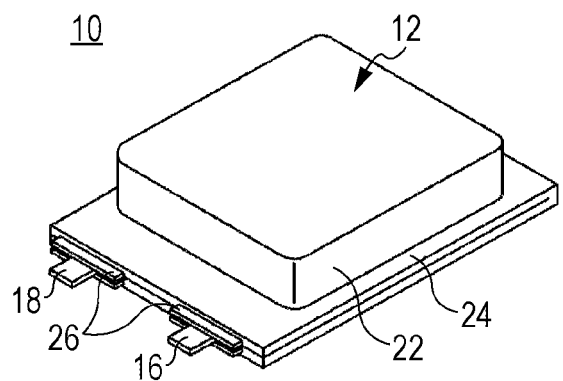
FIG. 1 is a perspective view of a laminate-type nonaqueous electrolyte secondary battery according to an embodiment.

Embodiments of the present invention are described below in detail. However, the embodiments below are exemplified in order to understand the technical spirit of the present invention. It is not intended to limit the present invention to the embodiments. The present invention is equally applicable to various modifications made without departing from the technical spirit described in the claims. First, a method for manufacturing each of laminate-type nonaqueous electrolyte secondary batteries used in Experiment Examples 1 to 19 is described.

[Preparation of Positive Electrode Plate]

A positive electrode active material made of a lithium-cobalt composite oxide ($LiCoO_2$) was prepared as described below. Tricobalt tetraoxide ($Co_3O_4$) obtained by the pyrolysis of cobalt carbonate ($CoCO_3$) was used as a cobalt source. Lithium carbonate ($Li_2CO_3$) as a lithium source was mixed therewith, followed by firing at 850° C. for 20 hours in an air atmosphere, whereby the lithium-cobalt composite oxide was obtained. This was used as lithium-cobalt composite oxide particles common to Experiment Examples 1 to 19.

A positive electrode active material made of a lithium-nickel-cobalt-manganese composite oxide ($LiNi_{0.5}Co_{0.2}Mn_{0.3}O_2$) was prepared as described below. As starting materials, lithium carbonate ($Li_2CO_3$) was used for a lithium source and a co-precipitated hydroxide represented by $Ni_{0.5}Co_{0.2}Mn_{0.3}(OH)_2$ was used for a transition metal source. These were weighed in predetermined amounts and were mixed together, followed by firing at 800° C. to 1,000° C. for 20 hours in an air atmosphere and controlling the average size of primary particles by the firing temperature, whereby the lithium-nickel-cobalt-manganese composite oxide represented by $LiNi_{0.5}Co_{0.2}Mn_{0.3}O_2$ was obtained. The average primary particle size of the lithium-nickel-cobalt-manganese composite oxide in each experiment example is described below.

The following powders were mixed together: 95 parts by mass of a total amount of a lithium-cobalt composite oxide powder and a lithium-nickel-cobalt-manganese composite oxide powder as positive electrode active materials, 2.5 parts by mass of a carbon powder as a conductive agent, and 2.5 parts by mass of a polyvinylidene fluoride (PVdF) powder as a binder. This was mixed with an N-methylpyrrolidone (NMP) solution, whereby slurry was prepared. The slurry was applied to both surfaces of a current collector, made of aluminium, having a thickness of 15 μm by a doctor blade method, whereby positive electrode active material mix layers were formed on both surfaces of a positive electrode current collector. Thereafter, it was rolled using a compaction roller and was cut to a predetermined size, whereby a positive electrode plate was prepared. Incidentally, the mixing ratio of the lithium-cobalt composite oxide to the lithium-nickel-cobalt-manganese composite oxide in each experiment example is described below.

[Measurement of Average Primary Particle Size]

The size of primary particles of positive electrode active material was determined in such a manner that the positive electrode active material particles were observed with a scanning electron microscope (SEM), the size of about 100 of primary particles was measured from a SEM image of one or more secondary particles, and the number average thereof was defined as the average primary particle size.

[Preparation of Negative Electrode]

(1) Preparation of Silicon Oxide Negative Electrode Active Material

Particles with a composition represented by $SiO_x$ ($x=1$) were adjusted in size by crushing and classification such that the average particle size was 6 μm, followed by heating to about 1,000° C. and coating the surface of the particles with carbon by a CVD method. This was pulverized and was classified, whereby a silicon oxide negative electrode active material was prepared.

Incidentally, the expression of effects of the present invention is not limited to the treatment temperature of $SiO_x$ or whether the coating treatment of a carbon material is performed. In the case of performing the coating treatment of the carbon material, a well-known method can be directly used. However, $SiO_x$ is preferably coated with the carbon material. The coating amount is preferably 1% by mass or more of each silicon oxide particle including the carbon material. The average particle size of SiO was measured using a laser diffraction particle size distribution analyzer (SALD-2000A manufactured by Shimadzu Corporation). A dispersion medium used was water and the refractive index was 1.70-0.01 i. The average particle size was defined as the particle size where the cumulative particle amount is 50% on a volume basis.

(2) Preparation of Graphite Negative Electrode Active Material

Scaly artificial graphite which forms nuclei and petroleum pitch which covers the surface of nuclei and which serves as a carbon precursor converted into amorphous carbon were prepared. These were mixed together in an inert gas atmosphere while being heated and were calcined, followed by crushing and classification, whereby graphite, surface-coated with amorphous carbon, having an average particle size of 22 μm was prepared. Incidentally, it is particularly preferred to use graphite with an average particle size of 18 μm to 22 μm.

(3) Preparation of Negative Electrode

Graphite prepared as described above and silicon oxide was mixed at a predetermined mass ratio to prepare a negative electrode active material. The negative electrode active material, carboxymethylcellulose (CMC) as a thickening agent, and styrene-butadiene rubber (SBR) as a binder were dispersed in water such that the mass ratio of the negative electrode active material (graphite+SiO) to CMC to SBR was 97:1.5:1.5, whereby negative electrode mix slurry was prepared. The negative electrode mix slurry was applied to both surfaces of a current collector, made of copper, having a thickness of 8 μm by a doctor blade method, whereby negative electrode active material mix layers were formed. Next, after moisture was removed by drying, it was rolled to a predetermined thickness using a compaction roller and was cut to a predetermined size, whereby negative electrode plates used in Experiment Examples 1 to 19 were prepared. Incidentally, details of the mixing ratio of graphite to silicon oxide in each experiment example are described below.

[Preparation of Nonaqueous Electrolyte Solution]

Ethylene carbonate (EC), methyl ethyl carbonate (MEC), and diethyl carbonate (DEC) were mixed at an EC-to-MEC-to-DEC ratio of 30:60:10 on a volume basis at 25° C. to prepare a nonaaqueous solvent. Furthermore, lithium hexafluorophosphate (LiPF$_6$) was dissolved in the nonaqueous solvent such that the concentration thereof was 1 mol/L. One prepared by adding 2.0% by mass of vinylene carbonate (VC) to a nonaqueous electrolyte solution was used as a nonaqueous electrolyte solution.

[Preparation of Nonaqueous Electrolyte Secondary Battery]

The positive electrode plate and negative electrode plate prepared as described above were wound with a separator therebetween, the separator including a porous membrane made of polyethylene, and a polypropylene tape was attached to the outermost edge, whereby a cylindrical wound electrode assembly was prepared. Next, this was pressed into a flat wound electrode assembly. Furthermore, the following material was prepared: a sheet-shaped laminate material having a five-layer structure consisting of a resin layer (polypropylene), an adhesive layer, an aluminium alloy layer, an adhesive layer, and a resin layer (polypropylene). A bottom portion and a cup-shaped electrode assembly-storing space were formed by folding the laminate material. Next, the flat wound electrode assembly and a nonaqueous electrolyte solution were provided in the cup-shaped electrode assembly-storing space in a glove box under an argon atmosphere. Thereafter, the separator was impregnated with the nonaqueous electrolyte solution by evacuating an inner portion of a laminate enclosure and an opening of the laminate enclosure was then sealed. In this way, a nonaqueous electrolyte secondary battery having a height of 62 mm, a width of 35 mm, and a thickness of 3.6 mm (a size excluding a sealed portion) was prepared. The design capacity of the obtained nonaqueous electrolyte secondary battery was 800 mAh at a charge cut-off voltage of 4.4 V (a lithium basis).

[Configuration of Nonaqueous Electrolyte Secondary Battery]

Figure 2:
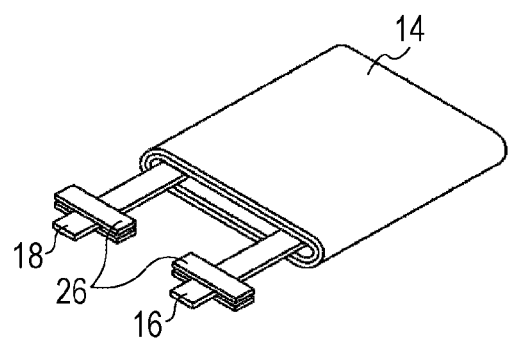
FIG. 2 is a perspective view of a wound electrode assembly shown in FIG. 1.

Herein, the configuration of a laminate-type nonaqueous electrolyte secondary battery common to Experiment Examples 1 to 19 is described with reference to FIGS. 1 and 2. The laminate-type nonaqueous electrolyte secondary battery 10 includes a laminate enclosure 12, a wound electrode assembly 14 which includes a positive electrode plate and a negative electrode plate and which has been formed flat, a positive electrode current-collecting tab 16 connected to the positive electrode plate of the wound electrode assembly 14, and a negative electrode current-collecting tab 18 connected to the negative electrode plate of the wound electrode assembly 14. The wound electrode assembly 14 includes the positive electrode plate, the negative electrode plate, and a separator, the positive electrode plate, the negative electrode plate, and the separator being strip-shaped, and is configured such that the positive electrode plate and the negative electrode plate are wound in such a state that the positive electrode plate and the negative electrode plate are insulated from each other with the separator.

The laminate enclosure 12 has a concave portion 22 formed therein. An end side of the laminate enclosure 12 is folded so as to cover an opening of the concave portion 22. An end portion 24 located at the periphery of the concave portion 22 and a folded facing portion are welded to each other such that an inner portion of the laminate enclosure 12 is sealed. The wound electrode assembly 14 is stored in the sealed inner portion of the laminate enclosure 12 together with a nonaqueous electrolyte solution.

The positive electrode current-collecting tab 16 and the negative electrode current-collecting tab 18 are placed such that each of the positive electrode current-collecting tab 16 and the negative electrode current-collecting tab 18 extend through a corresponding one of resin members 26 out of the sealed laminate enclosure 12. Electricity is supplied outside through the positive electrode current-collecting tab 16 and the negative electrode current-collecting tab 18. Each of the resin members 26 is placed between the laminate enclosure 12 and a corresponding one of the positive electrode current-collecting tab 16 and the negative electrode current-collecting tab 18 for the purpose of an increase in adhesion and the purpose of preventing short circuiting due to an aluminium alloy layer of a laminate material.

Experiment Examples 1 to 7

Nonaqueous electrolyte secondary batteries according to Experiment Examples 1 to 7 used those in which the average primary particle size of a lithium-nickel-cobalt-manganese composite oxide in a positive electrode active material was changed to 6.2 μm (Experiment Example 1), 4.9 μm (Experiment Example 2), 2.6 μm (Experiment Example 3), 2.4 μm (Experiment Example 4), 1.5 μm (Experiment Example 5), 1.2 μm (Experiment Example 6), or 0.9 μm (Experiment Example 7). The mixing ratio of a lithium-cobalt composite oxide to the lithium-nickel-cobalt-manganese composite oxide was 70:30 on a mass basis. The mixing ratio of graphite to silicon oxide was 95:5 on a mass basis.

[Charge/Discharge Test]

In order to confirm charge/discharge cycle characteristics, the laminate-type nonaqueous electrolyte secondary batteries according to Experiment Examples 1 to 7, were measured for initial capacity and capacity retention after charge/discharge cycles by a charge/discharge test below. First, at 25° C., charge was performed at a constant current of 1 It (=800 mA) until the battery voltage reached a charge voltage of 4.4 V. After the battery voltage reached a charge voltage of 4.4 V, charge was performed at a constant voltage of 4.4 V until the charge current reached 1/20 It (=40 mA). Discharge was performed at a constant current of 1 It (=800 mA) until the battery voltage reached 2.75 V. The amount of electricity flowing in this operation was determined as initial capacity.

The 500th cycle discharge capacity was measured by repeating charge and discharge under the same charge/discharge conditions as above. The capacity retention representing the cycle performance of the laminate-type nonaqueous electrolyte secondary batteries of Experiment Examples 1 to 7 was determined on the basis of a calculation formula below. Results were expressed as a relative index with 100 representing the result of Experiment Example 3 and were summarized in Table 1.

Capacity retention (%)=(500th cycle discharge capacity/first cycle discharge capacity)×100

TABLE 1

| | Average primary particle size of lithium-nickel-cobalt-manganese composite oxide (μm) | Capacity retention* | Initial capacity* |
|---|---|---|---|
| Experiment Example 1 | 6.2 | — | 85 |
| Experiment Example 2 | 4.9 | 99 | 97 |
| Experiment Example 3 | 2.6 | 100 | 100 |
| Experiment Example 4 | 2.4 | 100 | 100 |
| Experiment Example 5 | 1.5 | 100 | 100 |
| Experiment Example 6 | 1.2 | 98 | 101 |
| Experiment Example 7 | 0.9 | 83 | 101 |

*A relative index with 100 representing Experiment Example 3.

The following is clear from the results shown in Table 1. That is, comparing results of the initial capacity of Experiment Examples 1 to 7 shows that the initial capacity decreases as the average primary particle size of the lithium-nickel-cobalt-manganese composite oxide exceeds 2.6 μm. However, substantially the same results as those of Experiment Example 3 are obtained when the average primary particle size of the lithium-nickel-cobalt-manganese composite oxide ranges from 0.9 μm to 2.6 μm. This is probably because in the case of using one containing a silicon compound as a negative electrode active material, the utilization factor of inner portions of positive electrode active material particles decreases as the average primary particle size of the lithium-nickel-cobalt-manganese composite oxide exceeds 2.6 μm, leading to a reduction in initial capacity.

The capacity retention after 500 cycles decreases as the average primary particle size of the lithium-nickel-cobalt-manganese composite oxide exceeds 2.6 μm. Furthermore, the capacity retention after 500 cycles decreases as the average primary particle size of the lithium-nickel-cobalt-manganese composite oxide falls below 1.2 μm. When the average primary particle size of the lithium-nickel-cobalt-manganese composite oxide is 6.2 μm, the capacity retention is not evaluated because the initial capacity is low and therefore an object of this application, that is, high capacity is not satisfied.

However, when the average primary particle size of the lithium-nickel-cobalt-manganese composite oxide is 4.9 μm, the rate of reduction in capacity retention is small. Therefore, in consideration of both the initial capacity and the capacity retention after 500 cycles, it is clear that the upper limit of the average primary particle size of the lithium-nickel-cobalt-manganese composite oxide is preferably 5 μm and more preferably 3.0 μm in the case of using an interpolated value.

The capacity retention after 500 cycles decreases significantly as the average primary particle size of the lithium-nickel-cobalt-manganese composite oxide decreases from 1.2 μm to 0.9 μm. Therefore, the lower limit of the average primary particle size of the lithium-nickel-cobalt-manganese composite oxide is preferably 1.2 μm and more preferably 1.5 μm. That is, the average primary particle size of the lithium-nickel-cobalt-manganese composite oxide is preferably 1.2 μm to 5.0 μm and more preferably 1.5 μm to 3.0 μm.

Experiment Examples 8 to 14

In Experiment Examples 8 to 14, the average primary particle size of the lithium-nickel-cobalt-manganese composite oxide was 2.6 μm as is the case with Experiment Example 3, the mixing ratio of graphite as a negative electrode active material to silicon oxide was 95:5 on a mass basis as is the case with Experiment Example 3, the mixing ratio of the lithium-cobalt composite oxide to the lithium-nickel-cobalt-manganese composite oxide was varied as shown in Table 2, and the capacity retention after 500 cycles was measured. Incidentally, a method for measuring the capacity retention after 500 cycles was the same as that used in Experiment Examples 1 to 7. Results were summarized in Table 2 together with the result of Experiment Example 3.

TABLE 2

| | Mixing ratio (mass percent) | | Capacity retention* |
|---|---|---|---|
| | Lithium-cobalt composite oxide | Lithium-nickel-cobalt-manganese composite oxide | |
| Experiment Example 8 | 100 | 0 | 84 |
| Experiment Example 9 | 95 | 5 | 93 |
| Experiment Example 10 | 90 | 10 | 97 |
| Experiment Example 11 | 80 | 20 | 100 |
| Experiment Example 3 | 70 | 30 | 100 |
| Experiment Example 12 | 60 | 40 | 94 |
| Experiment Example 13 | 50 | 50 | 89 |
| Experiment Example 14 | 0 | 100 | 46 |

*A relative index with 100 representing Experiment Example 3.

The following is clear from the results shown in Table 2. That is, the capacity retention after 500 cycles decreases as the content of the lithium-nickel-cobalt-manganese composite oxide falls below 20% by mass. The capacity retention after 500 cycles also decreases as the content of the lithium-nickel-cobalt-manganese composite oxide exceeds 30% by mass. In this case, the capacity retention shown in Table 2 is 90 or less when the content of the lithium-nickel-cobalt-manganese composite oxide is less than 5% by mass and when the content thereof is more than 40% by mass. From this, the content of the nickel-cobalt-manganese composite oxide in a positive electrode active material is preferably 5% to 40% by mass.

Experiment Examples 15 to 19

In Experiment Examples 15 to 19, the average primary particle size of the lithium-nickel-cobalt-manganese composite oxide was 2.6 μm as is the case with Experiment Example 3, the mixing ratio of the lithium-cobalt composite oxide to the lithium-nickel-cobalt-manganese composite oxide was 70:30 on a mass basis as is the case with Experiment Example 3, the mixing ratio of graphite as a negative electrode active material to silicon oxide was varied as shown in Table 3 below, and the capacity retention after 500 cycles was measured. Incidentally, a method for measuring the capacity retention after 500 cycles was the same as that used in Experiment Examples 1 to 7. Results were summarized in Table 3 together with the result of Experiment Example 3.

TABLE 3

| | Mixing ratio of silicon oxide (mass percent) | Capacity retention* |
|---|---|---|
| Experiment Example 15 | 0.1 | 94 |
| Experiment Example 16 | 0.5 | 95 |
| Experiment Example 17 | 1.0 | 100 |
| Experiment Example 3 | 5.0 | 100 |
| Experiment Example 18 | 10.0 | 97 |
| Experiment Example 19 | 12.0 | 93 |

*A relative index with 100 representing Experiment Example 3.

The following is clear from the results shown in Table 3. That is, the capacity retention after 500 cycles decreases as the mixing ratio of silicon oxide in a negative electrode active material falls below 1% by mass. The capacity retention after 500 cycles also decreases as the mixing ratio thereof exceeds 5% by mass. In this case, the capacity retention after 500 cycles is 93 or more when the content of silicon oxide is 0.1% to 10.2% by mass. Furthermore, the capacity retention after 500 cycles is 95% or more when the content of silicon oxide is 0.5% to 10.0% by mass. From this, the content of silicon oxide in the negative electrode active material is preferably 0.1% to 12% by mass and more preferably 0.5% to 10% by mass.

In the above embodiment, an example in which a lithium-cobalt composite oxide and a lithium-nickel-cobalt-manganese composite oxide represented by $LiNi_{0.33}Co_{0.33}Mn_{0.34}O_2$ are used as positive electrode active materials has been shown. However, in the present invention, a different element-doped lithium-cobalt composite oxide containing zirconium, magnesium, aluminium, or the like may be used as the lithium-cobalt composite oxide. Likewise, as the lithium-nickel-cobalt-manganese composite oxide, when the lithium-nickel-cobalt-manganese composite oxide is represented by $Li_aNi_bCo_cMn_{1-b-c}O_2$, the following ranges are preferable from the viewpoint of the stability of primary particle: $0.9<a\leq1.2$, $0<b\leq0.8$, and $0<c\leq0.9$. Furthermore, the following ranges are more preferable from the viewpoint of suppressing the reduction of cycle characteristics: $0.9<a\leq1.2$, $0.3\leq b\leq0.6$, and $0.2\leq c\leq0.4$.

In the above embodiment, an example in which a mixture of graphite and a silicon oxide represented by $SiO_x$ ($0.5\leq x<1.6$) is used as a negative electrode active material has been shown. However, even if metallic silicon or a silicon alloy is used instead of the silicon oxide represented by $SiO_x$, a similar action effect is achieved.

In the above embodiment, an example in which a mixed solvent of EC, MEC, and DEC is used as a nonaqueous solvent in a nonaqueous electrolyte solution has been shown. However, in addition, the following compounds can be used: cyclic carbonates such as propylene carbonate (PC) and butylene carbonate (BC); fluorinated cyclic carbonates; lactones (cyclic carboxylates) such as γ-butyrolactone (γ-BL) and γ-valerolactone (γ-VL); linear carbonates such as dimethyl carbonate (DEC), methyl propyl carbonate (MPC), and dibutyl carbonate (DBC); fluorinated linear carbonates; linear carboxylates such as methyl pivalate, ethyl pivalate, methyl isobutyrate, and methyl propionate; amide compounds such as N,N'-dimethylformamide and N-methyloxazolidinone; sulfur compounds such as sulfolane; room-temperature molten salts such as 1-ethyl-3-methylimidazolium tetrafluoroborate; and the like. These may be used alone or in combination.

Furthermore, a lithium salt usually used as an electrolyte salt in nonaqueous electrolyte secondary batteries can be used. Examples of the lithium salt include $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like in addition to lithium hexafluorophosphate ($LiPF_6$). These can be used alone or in combination.

The following compounds may be added to a nonaqueous electrolyte solution as a compound for stabilizing electrodes in addition to vinylene carbonate (VC): for example, vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, biphenyl (BP), fluoroethylene carbonate (FEC), adiponitrile (AdpCN), and the like. These compounds may be appropriately used in combination.

In Experiment Examples 1 to 6, the laminate-type nonaqueous electrolyte secondary batteries have been shown such that the increment of battery thickness can be confirmed well. However, the present invention is applicable to cylindrical nonaqueous electrolyte secondary batteries and rectangular nonaqueous electrolyte secondary batteries including an enclosure made of metal.

REFERENCE SIGNS LIST

10: Nonaqueous electrolyte secondary battery
12: Laminate enclosure
14: Wound electrode assembly
16: Positive electrode current-collecting tab
18: Negative electrode current-collecting tab
22: Concave portion
24: End portion
26: Resin members

The invention claimed is:

1. A nonaqueous electrolyte secondary battery comprising:
   a positive electrode plate containing a lithium-cobalt composite oxide ($LiCoO_2$) and a lithium-nickel-cobalt-manganese composite oxide ($Li_aNi_bCo_cMn_{1-b-c}O_2$, $0.9<a\leq1.2$, $0<b\leq0.8$, $0<c\leq0.9$) having an average primary particle size of 1.2 μm to 5.0 μm as a positive electrode active material,
   a negative electrode plate containing graphite and containing silicon oxide ($SiO_x$, $0.5\leq x<1.6$) as a negative electrode active material,
   a separator, and
   a nonaqueous electrolyte,
   wherein the positive electrode active material contains 5% to 40% by mass of the lithium-nickel-cobalt-manganese composite oxide,
   wherein the negative electrode active material contains 0.1% to 12% by mass of silicon oxide ($SiO_x$, $0.5\leq x<1.6$) in terms of silicon.

2. The nonaqueous electrolyte secondary battery according to claim 1, wherein the lithium-nickel-cobalt-manganese composite oxide has an average primary particle size of 1.5 μm to 3.0 μm.

3. The nonaqueous electrolyte secondary battery according to claim 1, wherein the negative electrode active material contains 0.5% to 10% by mass of silicon oxide ($SiO_x$, $0.5 \leq x < 1.6$) in terms of silicon.

\* \* \* \* \*